United States Patent [19]

Shirley et al.

[11] 3,920,894

[45] Nov. 18, 1975

[54] PSEUDO-RANDOM PARALLEL WORD GENERATOR

[75] Inventors: Dorrel Roosevelt Shirley, Staten Island, N.Y.; Gilbert Johnson Stiles, Sr., Wayside, N.J.

[73] Assignee: Bell Telephone Laboratories, Incorporated, Murray Hill, N.J.

[22] Filed: Mar. 11, 1974

[21] Appl. No.: 450,171

[52] U.S. Cl. .................... 178/22; 235/152; 325/42; 331/78; 340/146.1 A

[51] Int. Cl.².. H04B 1/10; H04L 9/04; H03K 13/32

[58] Field of Search ......... 178/22; 331/78; 235/152; 325/42

[56] References Cited

UNITED STATES PATENTS

| | | | |
|---|---|---|---|
| 3,624,610 | 11/1971 | Warring | 331/78 |
| 3,700,806 | 10/1972 | Vasseur | 331/78 |
| 3,728,529 | 4/1973 | Kartchner et al. | 331/78 |
| 3,761,696 | 9/1973 | Russell | 331/78 |
| 3,784,743 | 1/1974 | Shroeder | 178/22 |

*Primary Examiner*—Maynard R. Wilbur
*Assistant Examiner*—H. A. Birmiel
*Attorney, Agent, or Firm*—John K. Mullarney

[57] ABSTRACT

A low speed, parallel word generator is developed from a series connected pseudo-random word generator that comprises a maximal length feedback shift register with a modulo-2 adder in the feedback path. More specifically, the n cells of said shift register are reconnected to form a parallel m-rail output version of the series connected word generator. The m-rail output has a pseudo-random binary sequence that is normally the same as the pseudo-random output sequence of the series word generator. The reconnecting circuitry includes a plurality of modulo-2 adders selectively connected between predetermined cells of the parallel word generator. Clock pulse signals are applied to each of the cells of the reconnected circuit at a rate that is normally 1/m times the rate at which the series word generator is clocked. A skip mode is periodically established, after a preselected number of input clock pulses, to cause the parallel word generator to skip a normal clock pulse period and alternatively to advance the parallel format, pseudo-random, binary sequence by a selected additional amount.

6 Claims, 8 Drawing Figures

SERIAL WORD GENERATOR

FIG. 6

| 1 | 2 | 3 | |
|---|---|---|---|
| 1 | 1 | 1 | |
| 1 | 1 | 1 | |
| 1 | 0 | 0 | |
| 0 | 0 | 0 | |
| 0 | 1 | 0 | |
| 0 | 0 | 0 | |
| 0 | 1 | 1 | |
| 0 | 0 | 0 | |
| 0 | 1 | 0 | |
| 1 | 0 | 0 | |
| 0 | 1 | 1 | |
| 1 | 1 | 0 | |
| 0 | 1 | 0 | |
| 0 | 0 | 1 | |
| 0 | 1 | 1 | |
| 0 | 0 | 1 | |
| 1 | 1 | 0 | |
| 1 | 0 | 1 | |
| 0 | 0 | 1 | |
| 1 | 1 | 1 | |
| 1 | 0 | 1 | |
| 0 | 0 | 0 | |
| 0 | 1 | 1 | |
| 1 | 0 | 0 | |
| 0 | 1 | 0 | |
| 0 | 1 | 0 | |
| 0 | 1 | 1 | |
| 0 | 1 | 1 | |
| 0 | 1 | 0 | |
| 1 | 1 | 0 | |
| 1 | 1 | 1 | |
| 1 | 0 | 1 | |
| 1 | 0 | 0 | |
| 0 | 1 | 1 | |
| 0 | 1 | 0 | |
| 0 | 1 | 0 | |
| 1 | 1 | 1 | |
| 0 | 1 | 1 | |
| 1 | 0 | 0 | |
| 1 | 1 | 0 | |
| 0 | 1 | 0 | |
| 1 | 0 | 1 | |
| 0 | ⋮ | ⋮ | 127 BITS (END OF PERIOD) |
| ⋮ | ⋮ | ⋮ | |

FIG. 7

OUTPUT CELLS

| (1) F | (2) E | (3) D | (4) C | (5) B | (6) A | (7) G |
|---|---|---|---|---|---|---|
| 1 | 1 | 1 | 1 | 1 | 1 | 0 |
| 1 | 1 | 1 | 1 | 0 | 0 | 1 |
| 1 | 0 | 0 | 0 | 0 | 0 | 1 |
| 0 | 0 | 0 | 0 | 1 | 0 | 0 |
| 0 | 1 | 0 | 0 | 0 | 0 | 0 |
| 0 | 0 | 0 | 0 | 1 | 1 | 0 |
| 0 | 1 | 1 | 0 | 0 | 0 | 0 |
| 0 | 0 | 0 | 0 | 1 | 0 | 1 |
| 0 | 1 | 0 | 1 | 0 | 0 | 0 |
| 1 | 0 | 0 | 0 | 1 | 1 | 0 |
| 0 | 1 | 1 | 1 | 1 | 0 | 0 |
| 1 | 1 | 0 | 0 | 1 | 0 | 1 |
| 0 | 1 | 0 | 0 | 0 | 1 | 0 |
| 0 | 0 | 1 | 0 | 1 | 1 | 0 |
| 0 | 1 | 1 | 0 | 0 | 1 | 1 |
| 0 | 0 | 1 | 1 | 1 | 0 | 1 |
| 1 | 1 | 0 | 1 | 0 | 1 | 1 |
| 1 | 0 | 1 | 0 | 0 | 1 | 0 |
| 0 | 0 | 1 | 1 | 1 | 1 | 1 |
| • | • | • | • | • | • | • |

FIG. 8

OUTPUT CELLS

| (1) F | (2) E | (3) D | (4) C | (5) B | (6) A | (7) G | |
|---|---|---|---|---|---|---|---|
| 1 | 1 | 1 | 1 | 1 | 1 | 0 | ← |
| 1 | 1 | 1 | 1 | 0 | 0 | 1 | ← |
| 1 | 0 | 0 | 0 | 0 | 0 | 1 | ← |
| 0 | 0 | 0 | 0 | 1 | 0 | 0 | |
| 0 | 1 | 0 | 0 | 0 | 0 | 0 | |
| 0 | 0 | 0 | 0 | 1 | 1 | 0 | |
| 0 | 1 | 1 | 0 | 0 | 0 | 0 | |
| 0 | 0 | 0 | 0 | 1 | 0 | 1 | NORMAL CLOCK SIGNALS |
| 0 | 1 | 0 | 1 | 0 | 0 | 0 | |
| 1 | 0 | 0 | 0 | 1 | 1 | 0 | |
| 0 | 1 | 1 | 1 | 1 | 0 | 0 | |
| 1 | 1 | 0 | 0 | 1 | 0 | 1 | |
| 0 | 1 | 0 | 0 | 0 | 1 | 0 | |
| 0 | 0 | 1 | 0 | 1 | 1 | 0 | |
| 0 | 1 | 1 | 0 | 0 | 1 | 1 | ← |
| 0 | 0 | 1 | 1 | 1 | 0 | 1 | ← SKIP |
| 1 | 0 | 1 | 0 | 1 | 0 | 1 | |
| 0 | 1 | 0 | 0 | 1 | 1 | 1 | |
| 0 | 1 | 1 | 1 | 1 | 1 | 0 | |
| • | • | • | • | • | • | • | |

PSEUDO-RANDOM PARALLEL WORD GENERATOR

BACKGROUND OF THE INVENTION

This invention relates to digital data transmission systems and, more particularly, to a pseudo-random word generator useful in the scrambling of digital data signals for the purpose of improving the statistical characteristics thereof.

Tests have shown that digital data transmission systems have an error performance that is input pattern dependent. This is due to a large extent to the unsatisfactory nature of the statistical characteristics of the digital data signals themselves. For example, more or less continuous signal patterns (i.e., continuous binary ones or zeros) often occur in digital data message signals, especially during idle conditions. This results in the introduction of an unwanted d.c. shift in the digital data bit stream and, as a consequence, degradation in the overall error performance of the system. To improve the aforementioned signal statistics and thus improve the error performance of a digital data transmission system, it is now common practice to scramble the digital data signals prior to transmission; see U.S. Pat. No. 3,649,915 to H. A. Mildonian, issued Mar. 14, 1972.

This scrambling of the digital data is carried out by either delivering the data itself directly to a data scrambler as in the Mildonian patent, supra, or, as is now more commonly done, by modulo-2 adding the digital data to a pseudo-random word produced by a pseudo-random word generator. In either case, the scrambler or word generator typically comprises a series connected feedback shift register with at least one modulo-2 adder in the feedback path.

Series connected or serial word generators have in the past performed quite satisfactorily, but as transmission rates continue to climb the design of a suitable serial word generator becomes critical. For example, the Bell System's T-4 Carrier System is designed to transmit digital data at a rate of 274.176 Mb/s and the serial word generator intended for use in the same must operate at one-half this transmission rate. To design a pseudo-random serial word generator capable of error-free operation at a rate of approximately 137 MHz is difficult; the circuit layout problems that are associated with such a high frequency circuit are critical and necessitate the use of higher power, expensive, integrated circuitry.

SUMMARY OF THE INVENTION

It is a primary object of the present invention to improve the statistical characteristics of digital data signals and to thereby improve the error performance of digital data transmission systems.

It is a related object to provide a pseudo-random word generator that operates at a relatively low speed and as a result permits the use of lower power, less costly, integrated circuits.

A further object of the invention is to provide a parallel pseudo-random word generator that operates at a fraction of the speed of a serial word generator, while generating the same pseudo-random output sequence as said serial word generator.

In accordance with the present invention, a low speed parallel word generator is formed by reconnecting the cells of a series connected pseudo-random word generator which is comprised of an n-cell feedback shift register and at least one modulo-2 adder in the feedback path. More particularly, the n-cells of said shift register are reconnected to form a parallel m-rail output version of the series connected word generator. The m-rail output has a pseudo-random binary sequence that is normally the same as the pseudo-random output sequence of the series connected word generator. The reconnecting means comprises a plurality of modulo-2 adders selectively connected between predetermined cells of the parallel word generator. Clock pulse signals are applied to each of the cells of the reconnected circuit at a rate that is normally 1/m times the rate at which the series word generator is clocked. A skip mode is periodically established, after a preselected number of input clock pulses, to cause the parallel word generator to skip a normal clock pulse period and alternatively to advance the parallel format, pseudo-random, binary sequence by a predetermined additional amount. This additional amount is equivalent to the advance produced in the series word generator by a single input clock signal thereto. The normal mode of operation is then re-established following the advance or skip mode.

BRIEF DESCRIPTION OF THE DRAWINGS

The above and other objects and various features of the invention will be more readily appreciated as the same becomes better understood by reference to the following detailed description when considered in connection with the accompanying drawings in which:

FIGS. 6, 7 and 8 are tables which are useful in the explanation of the invention.

DETAILED DESCRIPTION

Figure 1:
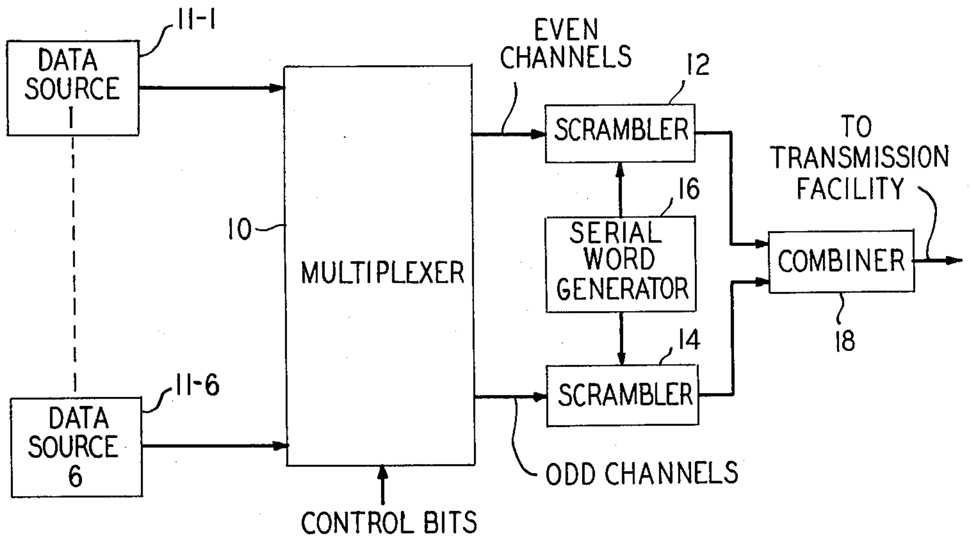
FIG. 1 is a simplified schematic block diagram of a part of an exemplary digital data transmission system incorporating a serial word generator.

Turning now to FIG. 1 of the drawings, there is shown a portion of a digital data transmission system which incorporates signal scrambling apparatus. This abbreviated showing of FIG. 1 corresponds to circuitry of the Bell System's T-4 Carrier System. The multiplexer 10 combines up to six 44.736 Mb/s digital signals into a two-level 274.176 Mb/s T-4 signal for transmission over a coaxial cable, waveguide or a digital radio facility. The six digital data signals are derived from the data source 11-1 through 11-6, and each data signal may represent PCM encoded voice or video information, digital data from a data set, etc. The multiplexer 10 serves to multiplex the data from the data sources, by completely interleaving the same, and it further serves to periodically insert a pair of control bits into the T-4 bit stream, in a selected manner to be described hereinafter. The multiplexer 10 delivers two separate and distinct digital bit streams to the scramblers 12 and 14 respectively, each bit stream being at a rate of approximately 137 MHz or one-half of the T-4 signal rate. The data scramblers insure that the T-4 bit stream has equal densities of logical ones and zeros. This improves the statistical characteristics of the signal and makes it easier to extract timing information.

The serial word generator 16, to be described in detail hereinafter, serves to generate a pseudo-random binary signal sequence. The control bits noted above are sent after each set of 96 multiplexed information bits. Between the times that these control bits are transmitted, each bit of the pseudo-random sequence with its complement is used to scramble two T-4 information bits, but those pseudo-random bits which occur during the control bit intervals are ignored (i.e., the control bits are not scrambled). This method of utilizing each pseudo-random bit and its complement requires that the word generator 16 need only operate at 137 MHz or one-half of the T-4 signal rate. The scramblers 12 and 14 provide a modulo-2 type function. The 137 MHz pseudo-random sequence from serial word generator 16 is modulo-2 added to those T-4 bits corresponding to the even channels (2, 4 and 6), while the complement thereof is modulo-2 added to those T-4 bits corresponding to the odd channels (1, 3 and 5). The output of scramblers 12 and 14 are then combined in the combiner 18, which provides an OR type function. The ouput of combiner 18 has the signal format depicted in FIG. 3 of the drawings.

Figure 3:
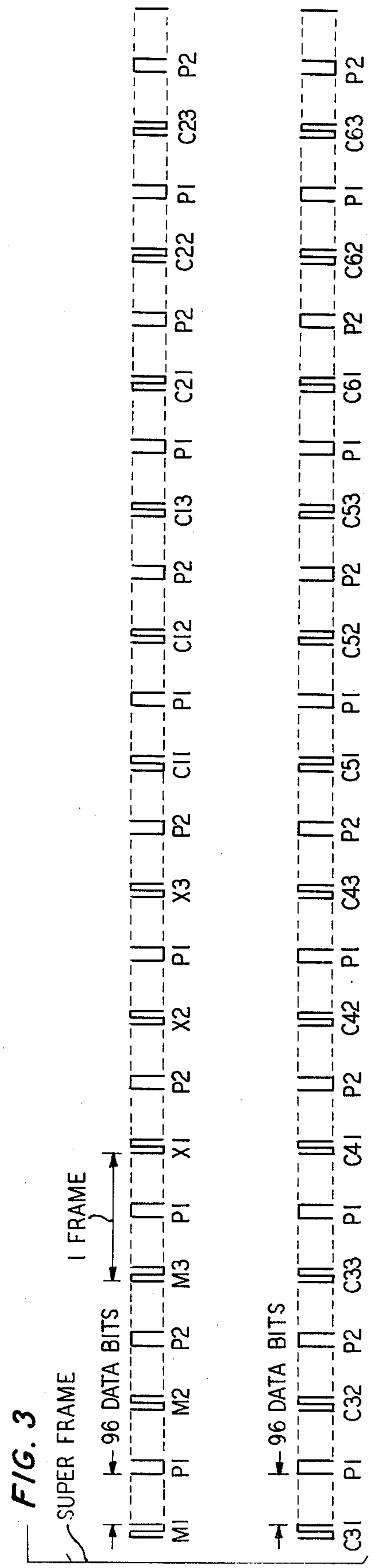
FIG. 3 illustrates the digital data bit stream transmitted by the systems shown in abbreviated form in FIGS. 1 and 2.

FIG. 3 illustrates one superframe of the T-4 signal format. In the T-4 signal, a pair of control bits are sent after each of 96 information or data bits. Each set or block of 96 data bits is composed of 16 groups of six scrambled bits (one from each channel in sequence). The "P" control bits provide parity information; the "X" bits provide signal information; the "C" bits are channel stuffing control bits, etc. The "M" bits are used to indicate the start of superframe and each superframe is composed of 24 frames. For present purposes, the purpose and intent of the control bits can be disregarded and it is only necessary to appreciate that a pair of control bits are sent after each block of 96 data bits and that the control bits are not scrambled. Thus, the pseudo-random bits from generator 16 which occur during control bit intervals are ignored. This can be readily accomplished by inhibit circuity (not shown) in each scrambler which serves to block those pseudo-random bits that occur during control bit intervals.

For a more detailed description of the system of FIG. 1 and of the signal format shown in FIG. 3, reference should be had to the cofiled U.S. patent to W. Bleickardt and R. B. Robrock, II (Case 3–8), U.S. Pat. No. 3.872,257.

Figure 2:
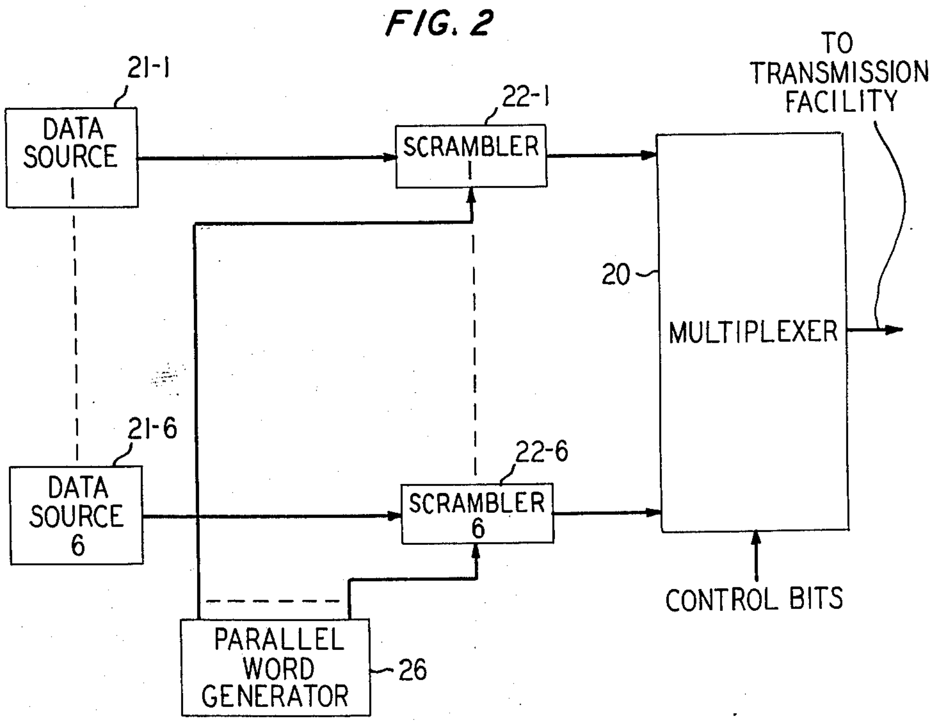
FIG. 2 is a simplified schematic block diagram of the same data transmission system, modified to incorporate the parallel word generator of the invention.

FIG. 2 shows the system of FIG. 1, modified to incorporate the parallel word generator of the present invention. The six data sources 21-1 through 21-6 and the multiplexer 20 correspond to the similarly named units of FIG. 1. In FIG. 2, however, the data signals are respectively scrambled prior to the multiplexing of the same in multiplexer 20. Also, the combining operation of FIG. 1 can be included in multiplexer 20 so that the latter presents at its output a single 274.176 Mb/s T-4 bit stream. The scramblers 22-1 through 22-6 comprise modulo-2 adders and the parallel word generator 26 respectively delivers pseudo-random bits to each of the scramblers. As will be more evident hereinafter, the parallel word generator, constructed in accordance with the invention, can generate the same pseudo-random output sequence as the serial word generator 16 of FIG. 1; that is, it is functionally compatible with the series type generator. This is an important feature of the invention, since both type generators might conceivably be utilized in a T-4 communications network.

The parallel word generator of the invention permits the scrambling operation to be carried out before the multiplex point. With the exception of this modification, however, the digital data transmission system itself consitutes no part of the present invention and it will be obvious to those in the art that the inventive concepts here disclosed can be used with other and different data transmission systems.

As will be apparent to those skilled in the art, the receiving apparatus at the other end of the transmission facility is essentially the inverse or complement of the transmission apparatus shown in FIG. 1 or FIG. 2 and hence block diagram schematics of said receiving apparatus are not believed necessary. With regard to the transmission system of FIG. 2, the data descramblers in the receiving apparatus would be disposed between the digital demultiplexer and the data receivers.

Figure 4:
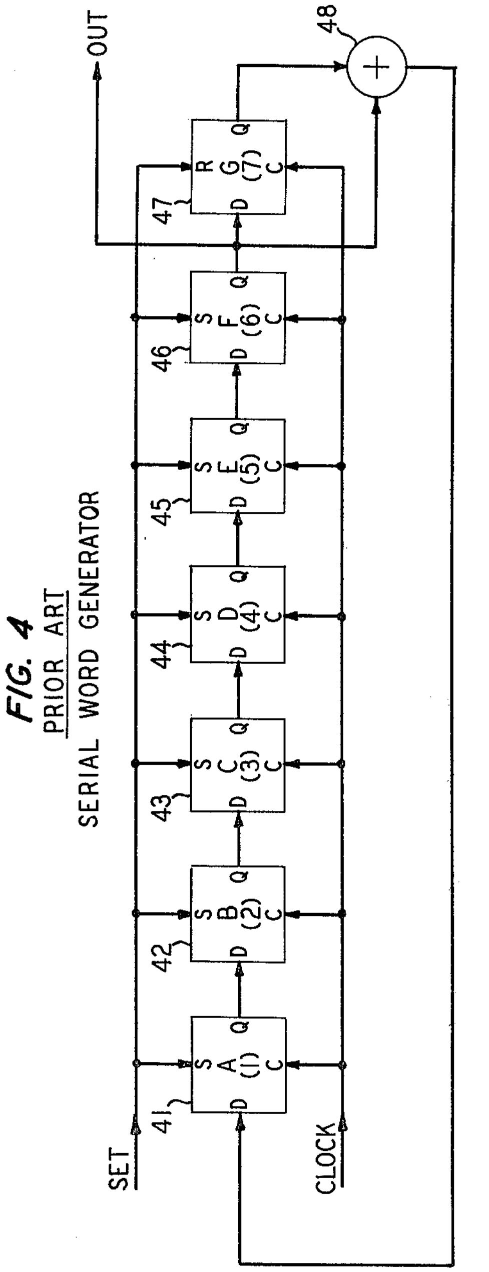
FIG. 4 PRIOR ART
FIG. 4 is a schematic diagram of a serial word generator known in the prior art.

The serial word generator 16 of FIG. 1 may have a configuration such as that shown in FIG. 4. The series connected word generator of FIG. 4 comprises a maximal length feedback shift register with a modulo-2 adder connected in the feedback path. This seven cell feedback shift register produces a pseudo-random binary signal sequence with a period of $2^7-1 = 127$ bits. The cells 41 – 47 of the shift register are clocked at a rate of 137 MHz and the resultant 137 MHz pseudo-random output sequence is taken from the sixth cell in the series. It is this sequence and its complement that are fed to the scramblers 12 and 14 of FIG. 1. After a 127 bit sequence is produced the circuit immediately recycles to produce the next 127 bit pseudo-random sequence, and so on. The circuit continually recycles until a new superframe is begun; a superframe is signaled by the marker (or framing) M bits. At the start of each superframe of the T-4 bit stream, the cells of the serial word generator are set (S) to their ONE state, except cell G which is set to the ZERO state; a 127 bit sequence then begins with the arrival of the next succeeding clock pulse signal. All of the bits of each 127 bit pseudo-random sequence and the complements thereof are respectively delivered to the scramblers 12 and 14, but those bits which occur during control bit intervals are ignored or blocked as previously described.

The seven cells of the feedback shift register can comprise "D"-type flip-flops, which are commercially available from Motorola and others. The application of a clock pulse to a D-type flip-flop serves to transfer the data at the input terminal D to the output terminal Q. However, a set signal applied to the set or "S" terminal of the flip-flop will "override" an input clock pulse. The serial word generator of FIG. 4, as well as the parallel word generator of FIG. 5, is in no way restricted to the above designated type flip-flop and other and different known flip-flop configurations can be used to advantages in either type of word generator.

Figure 5:
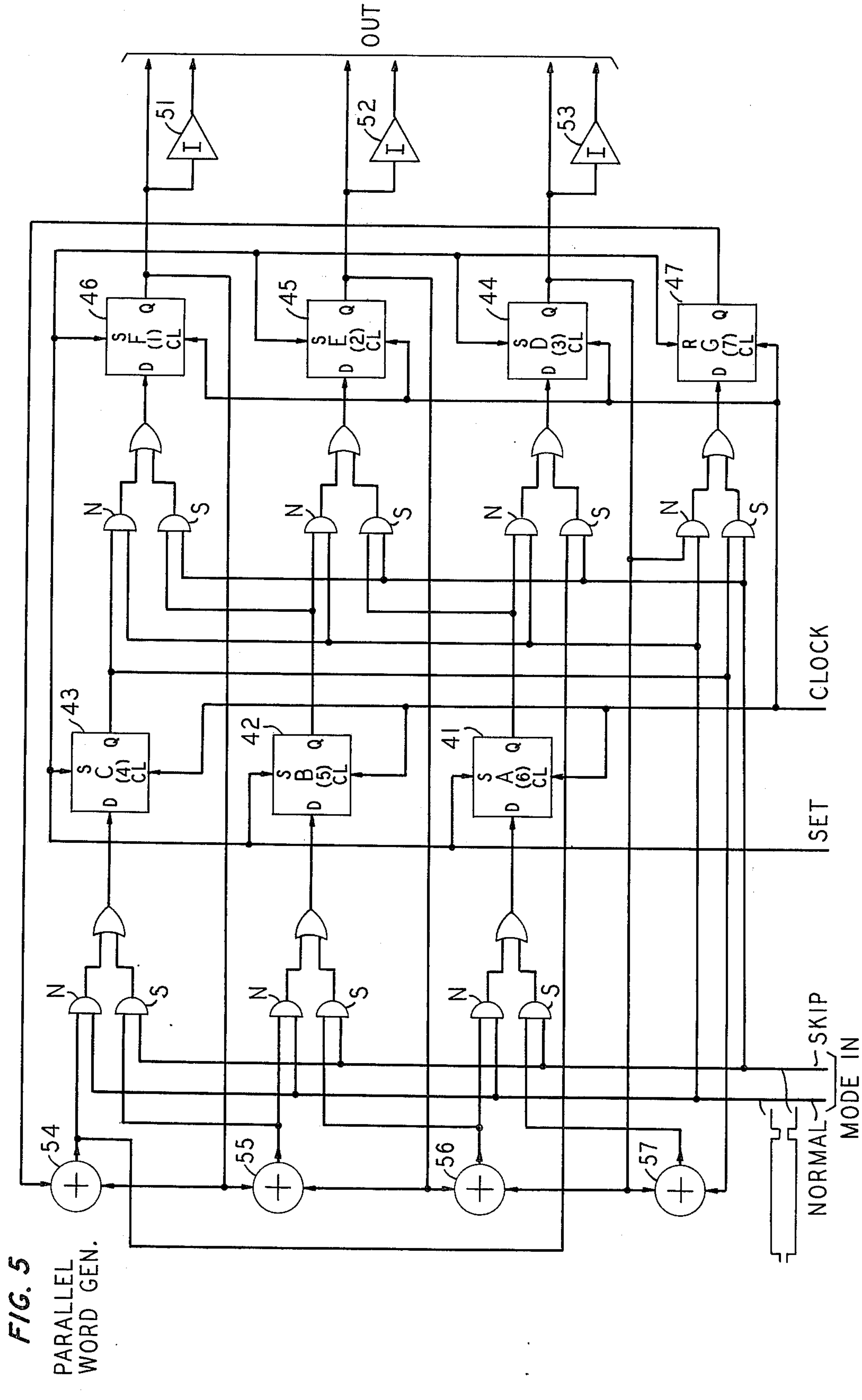
FIG. 5 is a schematic diagram of a parallel word generator constructed in accordance with the present invention.

The seven cells of the pseudo-random parallel word generator of FIG. 5 are connected to form a three-rail output version of a maximal length feedback shift register having a pseudo-random binary sequence with a length of $2^7-1 = 127$ bits. More specifically, the parallel word generator shown in FIG. 5 is formed by reconnecting the seven cells of the series word generator of FIG. 4 to provide a parallel three-rail output version of the series generator. Each output work (of three bits)

of the pseudo-random sequence with its complement is used to scramble six T-4 information bits; thus, the parallel word generator operates at one-sixth the T-4 signal rate or at approximately 45 Mb/s. Output is taken from three cells simultaneously (cells D, E and F); the outputs of the three cells are added modulo-2 to those T-4 bits corresponding to the even channels (2, 4 and 6), while the complements thereof are added modulo-2 to those T-4 bits corresponding to the odd channels (1, 3 and 5) in the following manner:

TABLE 1

| CELL | CHANNELS |
|---|---|
| $\overline{F}$ | 1 |
| F | 2 |
| $\overline{E}$ | 3 |
| E | 4 |
| $\overline{D}$ | 5 |
| D | 6 |

Although it results in a more complicated circuit, this parallel connection, or reconnection of the series generator cells, allows the parallel generator to operate at one-third the speed of the series word generator while generating the same output sequence. This has two major advantages; it avoids the critical layout problems that are associated with higher frequency circuits and it permits the use of lower power, less costly, integrated circuits.

Considering the parallel word generator circuit of FIG. 5 in more specific detail, the seven register cells bear the same letter designation (A–G) and reference numberation (41–47) as the corresponding cells in FIG. 4. The pseudo-random output sequence from this circuit is taken from the output of the D, E and F cells. And, the complements thereof are derived from the inverter circuits 51, 52 and 53. The cells 41–47 of FIG. 5 are normally clocked at a rate one-third the clock rate of the series circuit of FIG. 4. At the start of each superframe, each cell of the parallel word generator is set to its ONE state, except for the G cell 47 which is reset or set to ZERO. There is no exact equivalent in the circuit of FIG. 5 for the modulo-2 adder 48 of FIG. 4; rather, four modulo-2 adders are connected in the illustrated manner into the circuit of FIG. 5. The inclusion of these modulo-2 adders and the reasoning underlying the manner in which they are interconnected with the cells 41 – 47 will be made more evident hereinafter.

The word generator circuit of FIG. 5 must perform in two different modes of operation, i.e, a "normal" mode and a "skip" mode. This accounts for the AND/OR logic circuit that precedes the input to each of the cells 41 – 47. During the normal mode, the AND gates labeled N are enabled and the circuit operates in its normal or more usual fashion. During the skip mode, the AND gates labeled S are alternatively enabled and the normal clocking of the circuit is altered so as to alternatively advance the output binary sequence by a set amount. These two alternative modes of circuit operation will be covered in detail below.

The parallel word generator can be considered the full functional equivalent of the series connected word generator if it can be designed to generate the same pseudo-random sequence as that generated by the series type. With this objective in mind, a suitable design can be arrived at in the manner now to be described.

At one moment of time, $t$, let the contents of register cells A, B, C . . . , of FIG. 4, be $a, b, c$ . . . Let $t+\tau$ represent time or clock pulses after time $t$. Then it can be readily seen that the condition of the register cells as a function of time is as shown in TABLE 2.

TABLE 2

| Register Cells | Output of Each Register Cell After Each Clock Pulse | | | | | | | |
|---|---|---|---|---|---|---|---|---|
| | t | t+1 | t+2 | t+3 | t+4 | t+5 | t+6 | — |
| A | a | $f\oplus g$ | $e\oplus f$ | $d\oplus e$ | $c\oplus d$ | $b\oplus c$ | $a\oplus b$ | — |
| B | b | a | $f\oplus g$ | $e\oplus f$ | $d\oplus e$ | $c\oplus d$ | $b\oplus c$ | — |
| C | c | b | a | $f\oplus g$ | $e\oplus f$ | $d\oplus e$ | $c\oplus d$ | — |
| D | d | c | b | a | $f\oplus g$ | $e\oplus f$ | $d\oplus e$ | — |
| E | e | d | c | b | a | $f\oplus g$ | $e\oplus f$ | — |
| F | f | e | d | c | b | a | $f\oplus g$ | — |
| G | g | f | e | d | c | b | a | — |

The symbol indicates a modulo-2 addition. In particular, after three clock pulse periods, the contents of the register cells will be as shown in the $t+3$ column. The same result can be achieved with a single clock pulse signal (of reduced repetition rate) if the connections between the register cells are modified to immediately produce the logical signals shown in the $t+3$ column. A suitable circuit is shown in FIG. 5, where the outputs of the register cells F, E and D at times $t$; $t+3$; . . . are $f$, $e$ and $d$; $c$, $b$ and $a$; . . . The circuit of FIG. 5 operates in its normal mode at these times, i.e., the designated N AND gates are enabled. It will be evident that the outputs of the register cells F, E and D, of FIG. 5, at times $t$, $t+3$, . . . are the same as the outputs of register cell F of FIG. 4 for the times $t$, $t+1$, $t+2$ . . .

The $t+3$ column of TABLE 2 in effect dictates the interconnections between the register cells of FIG. 5 for normal operation. For example, assume the contents of cells A, B, C . . . , of FIG. 5, to be $a, b, c$ . . . at time $t$. Then with the occurrence of the next input clock pulse to the circuit of FIG. 5, at time $t+3$, the output of each cell must correspond to the column $t+3$. To this end, cell D is normally connected to receive the contents (a) of cell A; cell E normally receives the contents (b) of cell B; cell F receives the contents (c) of cell C; cell G receives the contents (d) of cell D; cell A is set in accordance with the modulo-2 addition of the contents of cells D and E ($d\oplus e$);cell B is set in accordance with the modulo-2 addition of the contents of cells E and F($e\oplus f$); and cell C is set in accordance with the modulo-2 addition of the contents of cells F and G ($f\oplus g$). These modulo-2 additions are carried out by the modulo-2 adders 56, 55 and 54, respectively.

As noted above, those pseudo-random bits of the series word generator 16 which occur during control bit intervals are ignored (i.e. blocked) to prevent the same from modifying the control bits. The required inhibiting process is periodic, occurring as bits 49, 98, 147 . . . of the series generated pseudo-random word. To achieve the same result for the parallel word generator, the connection between the register cells must be periodically modified so as to immediately produce the logical signals shown in the $t+4$ column. This modified connection of the register cells is only required, however, for one input clock bit interval every 16 clock pulses to the pseudo-random parallel word generator. For the first 15 of each set of 16 clock pulses after the initial resetting operation, the parallel word generator performs in a normal fashion (i.e., normal mode); the N AND gates are enabled. For the last clock pulse of each set of 16, a logical switching operation occurs to cause the circuit of FIG. 5 to work in the skip mode. To this end, the N gates are disabled and the S gates are now enabled. TABLE 3 shows the generator connections during the two modes of operation.

TABLE 3

| Parallel Word Generator Connections | | |
|---|---|---|
| | During Normal Mode | |
| Cell | Feeds | Cell |
| 4 | " | 1 |
| 5 | " | 2 |
| 6 | " | 3 |
| 1⊕7 | " | 4 |
| 1⊕2 | " | 5 |
| 2⊕3 | " | 6 |
| 3 | " | 7 |
| | During Skip Mode | |
| 5 | " | 1 |
| 6 | " | 2 |
| 1⊕7 | " | 3 |
| 1⊕2 | " | 4 |
| 2⊕3 | " | 5 |
| 3⊕4 | " | 6 |
| 4 | " | 7 |

Note, in FIG. 5, as well as FIG. 4, the register cells are given a parenthetic numeral designation (1 through 7) as well as a letter designation.

The following is a more detailed dicussion of the different modes of operation. First, consider the normal mode. The table of FIG. 6 shows the output sequence for one cycle or period (127 bits) of the series connected word generator. The output pulses of this generator occur serially at approximately 137 MHz, but in the table they have been grouped three to a row as a starting point to facilitate comparison with the output of the parallel word generator. Thus, this serial output is 1,1,1,1,1,1,1,0,0,0, . . . .

In the parallel word generator the cells 1, 2 and 3, FIG. 7, are designated as the output cells. Each successive row in the table of FIG. 6 dictates the correct 3-rail output states for each of the successive clock pulse signals applied to the parallel generator circuit of FIG. 5. This will be evident from a row-to-row comparison of FIG. 6 with the column 1 – 3 of FIG. 7.

Note that if we select cells 1, 2 and 3 as the shift register cells F, E and D, of FIGS. 5 and 7, and cells 4, 5 and 6 as cells C, B and A, then since these latter cells drive cells 1, 2 and 3 they must always contain the bits in columns 1, 2 and 3 of the next row. Similarly, the contents of cell 7 (G) must always be that shown in column 3 of the previous row.

The table of FIG. 7 illustrates the way in which the pseudo-random parallel word generator would operate if it were always in the normal mode. Columns 1, 2 and 3, of FIG. 7, are the same as the corresponding columns of the table of FIG. 6. Columns 4, 5 and 6, of FIG. 7, always contain the same as columns 1, 2 and 3 in the next row; column 7 the same as column 3 in the preceding row. If we ignore the skip mode for the present, the parallel word generator would continue to operate in the illustrated and described fashion and at the end of one period of 127 clock pulses the cells would be back in their reset state; the cycle would continually repeat in this manner until it is interrupted by the next superframe reset. Note that three clock pulses are required to generate each row of FIG. 6, while only a single clock pulse is neeeded to generate each row of FIG. 7. Thus the speed of operation of the circuit of FIG. 5 is only a fraction (⅓) of the speed of the operation of FIG. 4.

Turning now to the skip mode of operation, the purpose of this mode is to make the parallel word generator functionally compatible with the series version, of FIGS. 1 and 4, where only the information bits are scrambled and the output of the serial word generator is discarded when sending the control bits. The series word generator continues through its cycle without any interruption at control bit locations; because of this, there is a one bit interval every 48 bits where bits from the series word generator are not modulo-2 added to the bit stream. To produce the same effect, the mode of operation of the parallel word generator is changed for a one bit interval which occurs every 16 clock pulses or every 16 sets of 3 bits from the word generator. The skipping process is accomplished by using the AND/OR gates at the input of each cell of FIG. 5 as steering elements. The upper gates N are normally enabled to permit a normal mode of operation, but periodically (every 16 input clock pulses) the lower gates S are enabled to effect the skip mode of operation.

During the skip mode the following sequence of events occurs. The signal that would normally go to cell 2 is redirected to cell 1 where it will be used for scrambling channel 2 instead of channel 4; the input for cell 3 is redirected to cell 2 so as to be used for scrambling channel 4 instead of channel 6; the input for cell 3 now comes from the modulo-2 addition of cells 1 and 7 and is used for scrambling channel 6. To keep the word generator producing the correct sequence, the inputs to cells 4, 5 and 6 which drive the output cells must also be changed. The normal input for cell 5 (from adder 55) now drives cell 4 and the normal input for cell 6 (from adder 56) now drives cell 5. The input for cell 6 is obtained from the modulo-2 addition (adder 57) of the outputs of cells 3 and 4.

In the foregoing manner for every sixteenth clock pulse the normal flow of events that is shown in the table of FIG. 7 is modified by the skip operation. This is shown in FIG. 8 where the first 16 rows are the same as those of FIG. 7. Columns 1, 2 and 3 of the seventeenth line of FIG. 8, for example, must now hold the contents of columns 5, 6 and 1⊕7 of the previous line; column 7 of this same line must now contain the bit that was in column 4 of the previous line. The normal mode of operation of the circuit of FIG. 5 is thus temporarily interrupted to cause the parallel word generator to skip an amount equivalent to one bit position of the FIG. 6 table. Thereafter, the circuit of FIG. 5 is returned to its normal mode of operation for another fifteen normal clock pulse periods.

To effect the skip mode of operation, which occurs every sixteenth clock pulse period, the clock pulses delivered to the circuit of FIG. 5 are aperiodic. These aperiodic clock pulse signals are readily derived from the synthesizer or countdown chain which is driven by the master oscillator of the T-4 office. No attempt has been made to show the derivation of these clock pulses, since the same comprises no part of the present invention and involves no more than straightforward logic design known to the prior art; see the patent of Corbin et al., U.S. Pat. No. 3,410,235, issued Sept. 10, 1968.

It should be understood at this point that the principles of the present invention are in no way limited to the specific apparatus implementation of FIG. 5. For example, a parallel word generator can be developed in accordance with the invention to duplicate the function of any *n*-cell maximal length feedback register type of word generator. More particularly, a parallel word generator can be constructed in accordance with the invention to provide, at a reduced operating rate, a pseudo-random output sequence equivalent to that generated by any type of series word generator, be it maximal length or otherwise, or with plural modulo-2 adders coupled into the feedback path. Furthermore, the parallel word generator may or may not be designed to provide a skip mode type of operation. Accordingly, it is to be understood that the foregoing description is merely illustrative of the principles of the present invention and various modifications thereof may be devised by those skilled in the art without departing from the spirit and scope of the invention.

What is claimed is:

1. In a digital transmission system having a series connected pseudo-random word generator comprising an $n$-cell feedback shift register with at least one modulo-2 adder in the feedback path thereof, said word generator serving to scramble the binary data signals of a plurality of data sources in a pseudo-random fashion; a parallel word generator characterized by means for reconnecting the $n$-cells of said shift register to form a parallel $m$-rail output version of said series connected word generator, the composite $m$-rail output signal that is collectively developed on the parallel output rails of the parallel word generator having a pseudo-random binary sequence that is normally the same as the pseudo-random output sequence of said series connected word generator, the reconnecting means comprising a plurality of modulo-2 adders selectively connected between predetermined cells of said parallel word generator, means for applying clock pulse signals to said parallel word generator at a rate that is normally $1/m$ times the rate at which the series word generator is clocked, and means for causing the parallel word generator to skip a normal clock pulse period after a preselected number of input clock signals thereto and alternatively to advance the periodic pseudo-random output of the parallel word generator by a given additional amount.

2. In a digital transmission system as defined in claim 1 including means for modulo-2 coupling each of the $m$ outputs of the parallel word generator and the complements thereof to said data sources to respectively scramble each of the latter in a pseudo-random fashion.

3. In a digital transmission system as defined in claim 2 wherein the periodic pseudo-random output of the parallel word generator is advanced by an additional amount equivalent to the advance produced in the series word generator by a single input clock signal thereto.

4. In a digital transmission system as defined in claim 3 wherein $n$ and $m$ are integers greater than one, and $n>m$.

5. In a digital transmission system as defined in claim 4 wherein said series connected word generator comprises a maximal length feedback shift register of seven cells; said parallel word generator comprising a three-rail output with the cells thereof connected to normally form three parallel circuits of tandem connected cells.

6. A method for producing in a parallel format a pseudo-random binary signal sequence that is the same as a predetermined pseudo-random sequence selectively derived from a series connected pseudo-random word generator comprised of an $n$-cell feedback shift register having at least one modulo-2 adder in the feedback path, comprising the steps of reconnecting the $n$-cells of said shift register to form a parallel $m$-rail output version of said series connected word generator, the composite $m$-rail output signal that is collectively developed on the $m$ parallel output rails having a pseudo-random binary sequence that is normally the same as the pseudo-random output sequence of said series connected word generator, applying clock pulse signals to each of the cells of the reconnected circuit at a rate that is normally $1/m$ times the rate at which the series connected word generator is clocked, and skipping a normal clock pulse period after a preselected number of input clock pulse signals and alternatively advancing the parallel format, pseudo-random, binary signal sequence by a predetermined additional amount equivalent to the advance produced in the series word generator by a single input clock signal thereto.

* * * * *

UNITED STATES PATENT AND TRADEMARK OFFICE

CERTIFICATE OF CORRECTION

PATENT NO. : 3,920,894

DATED : November 18, 1975

INVENTOR(S) : Dorrel R. Shirley and Gilbert J. Stiles, Sr.

It is certified that error appears in the above-identified patent and that said Letters Patent are hereby corrected as shown below:

Column 4, last line, "work" should read --word--. Column 5, line 33, "numberation" should read --numeration--. Column 7, line 41, "column" should read --columns--. Column 8, line 60, "of" should read --to--; line 61, "3,410,235" should read --3,401,235--.

Signed and Sealed this

*sixth* Day of *April 1976*

[SEAL]

*Attest:*

RUTH C. MASON
*Attesting Officer*

C. MARSHALL DANN
*Commissioner of Patents and Trademarks*